(12) United States Patent
Newth

(10) Patent No.: US 11,542,998 B2
(45) Date of Patent: Jan. 3, 2023

(54) TOOL FOR DAMPENING OSCILLATION OF A ROTATING SHAFT

(71) Applicant: Gregory Lee Newth, Montague, MA (US)

(72) Inventor: Gregory Lee Newth, Montague, MA (US)

(*) Notice: Subject to any disclaimer, the term of this patent is extended or adjusted under 35 U.S.C. 154(b) by 0 days.

(21) Appl. No.: 17/187,799

(22) Filed: Feb. 27, 2021

(65) Prior Publication Data

US 2021/0268557 A1    Sep. 2, 2021

Related U.S. Application Data

(60) Provisional application No. 62/983,616, filed on Feb. 29, 2020.

(51) Int. Cl.
*F16F 7/00* (2006.01)
*B08B 9/045* (2006.01)
*F16F 15/02* (2006.01)

(52) U.S. Cl.
CPC ............. *F16F 7/00* (2013.01); *B08B 9/045* (2013.01); *B08B 2209/04* (2013.01); *F16F 15/02* (2013.01); *F16F 2232/02* (2013.01)

(58) Field of Classification Search
CPC .... F16F 7/00; F16F 15/02; F16F 15/10; F16F 2232/02; B08B 9/045; B08B 2209/04
See application file for complete search history.

(56) References Cited

U.S. PATENT DOCUMENTS

| | | |
|---|---|---|
| 2,090,174 A | 8/1937 | Albright |
| 2,549,659 A | 4/1951 | Brendel |
| 3,268,937 A | 8/1966 | Bollinger |
| 3,283,353 A | 11/1966 | Kirk |
| 3,897,602 A | 8/1975 | Waterbury |
| 4,617,693 A | 11/1986 | Meyer et al. |
| 4,837,887 A * | 6/1989 | McLaughlin ........... E03F 9/005 15/104.33 |

(Continued)

FOREIGN PATENT DOCUMENTS

| | | |
|---|---|---|
| GB | 715862 | 9/1954 |
| GB | 1556262 | 11/1979 |

OTHER PUBLICATIONS

"What's New?" brochure, Apr. 2019, 1 page, A.W. Perkins Co, Rutland VT US.

(Continued)

*Primary Examiner* — Adam D Rogers
(74) *Attorney, Agent, or Firm* — C. Nessler

(57) ABSTRACT

A tool called a spinner is interposed between a rotary driver and a flexible shaft that is being rotated and moved axially when a duct or chimney is being cleaned by a whip head at the end of the shaft. A tubular shape collar has a home position on the body of the spinner. Grasping and holding the collar at its home position, while the driver rotates, helps steady the driver as the body moves within the collar. To dampen oscillation of the shaft, the collar is moved lengthwise from the body, and along the shaft to a working position where it is held manually. The collar is retained on the body by frictional means. A user can overcome the retaining force and, without using a second tool, slide the collar off the body and along the shaft to the working position, while the spinner is rotating or stationary.

13 Claims, 4 Drawing Sheets

(56) References Cited

U.S. PATENT DOCUMENTS

| | | | | |
|---|---|---|---|---|
| 5,426,807 A * | 6/1995 | Grimsley | ................ | E03F 9/005 |
| | | | | 15/104.095 |
| 8,574,037 B2 | 11/2013 | Kresge | | |
| 10,288,123 B2 * | 5/2019 | Newth | .................... | F16D 1/108 |
| 2008/0000040 A1 | 1/2008 | Peterson | | |
| 2009/0255071 A1 * | 10/2009 | Jones | ................... | A46B 13/001 |
| | | | | 15/56 |
| 2019/0118230 A1 * | 4/2019 | Newth | .................... | B08B 9/045 |

OTHER PUBLICATIONS

"Item # PGH-6 Power Grip Handle", web advertisement, 1 page, Jan. 2020, Snaplocksystems.com.

"The New Flynn Grip Rod Guide", web advertisement, 1 page, Dec. 2019, Snaplocksystems.com.

"International Search Report—Application PCT/US21/20138," 5 pages, Feb. 27, 2021, ISA/US.

* cited by examiner

TOOL FOR DAMPENING OSCILLATION OF A ROTATING SHAFT

This application claims benefit of provisional application Ser. No. 62/983,616, filed Feb. 29, 2020.

TECHNICAL FIELD

The present invention relates to tools for controlling the lateral oscillation of a rotating flexible shafts (which is often referred to as whipping), particularly when the shaft is used to drive a whip head during cleaning of a chimney or duct interior.

BACKGROUND

Tradesmen, also called artisans herein, who clean ducts, chimneys and other conduits often do so by pushing and pulling along the duct length a rotating round wire brush, or a whip head, mounted on the end of a long shaft. A typical whip head comprises a central body from which plastic or metal filaments extend radially. The shaft is typically rotated by a driver such as an electric hand drill. See Patent Publication U.S. 2019/0118230 A1 "Duct cleaning device and method." The publication describes a duct cleaning process, along with whip heads and shaft couplers that are shaped for better overcoming obstructions along the length of the duct.

A familiar type of rotatable shaft that is used with a whip head to clean chimneys, air carrying ducts, and the like comprises a multiplicity of semi-rigid shaft segments made of fiber-polymer composite material that are connected to each other by separable couplings. While the shaft is rotated by a driver at a chosen variable speed, which may be up to hundreds of revolutions per minute, the artisan moves the whip head by pushing and pulling on the shaft at a duct access opening.

There is often a tendency, particularly when the artisan is pushing on the rotating shaft to make the whip head move along the duct, for the shaft to rapidly oscillate laterally (or to "whip") in the free space that is between the rotary driver and the duct access opening. If uncontrolled, the oscillation can damage the shaft or the duct opening; and it generally inhibits lengthwise motion. Sometimes, an artisan may slow the rotational speed and/or put a gloved or bare hand around the shaft to steady it, either of which may be considered undesirable. The same kind of shaft oscillation problem arises in connection with the cleaning of plumbing drains.

Devices are known that appear to mitigate the shaft oscillation problem. In one approach, a hollow collar element such as a piece of tubing that has a loose fit around a rotating shaft may be slid along the shaft to the needed location and manually held there to guide the shaft and presumably suppress oscillation in wire-wound cable type shafts used by plumbers. See McLaughlin U.S. Pat. 4,837,887 and Kirk U.S. Pat. 3,283,553 for examples of such. When the collar is not needed, the user must either unhook the shaft from the driver and remove and stow the collar, or the user must leave the collar someplace along the shaft where its weight may contribute to oscillation or it otherwise may be a nuisance.

Devices for guiding flexible shafts have been used by plumbers comprise telescoping tubes attached to the apparatus which contains, reels-out, and rotates a flexible shaft. Bollinger U.S. Pat. No. 3,268,937, Meyer U.S. Pat. No. 4,617,693 and Waterbury U.S. Pat. No. 3,897,602 describe funnel shape shaft-holders that have telescoping tube structures at the end where the cable-shaft is discharged. Increasing the extension of a tube is only effective for oscillation that is close to the feeder/driver, increases weight of the feeder; and when there are a multiplicity of telescoped sections (to reduce the collapsed or storage length of the device) there may be jamming of the sections in dirty environments. And controlling shaft angling near the driver is constrained.

Power Grip Handle (Product PGH6, SnapLok Systems LLC, Bloomfield, Conn.) is a device intended to be used in place of a segment of a shaft that is comprised of multiple releasably-coupled-together semi-flexible shaft segments. The PGH6 device comprises a sleeve that is rotatable about an inner rigid shaft piece which has opposing half coupling ends. The user holds the exterior of the device while the shaft is rotating to suppress oscillation. A disadvantage is that the user has to estimate where oscillation will take place, or has to take apart and reassemble the shaft if his original estimate was wrong. And where the device is located, the shaft is not semi-flexible.

Thus, there is a need for further improvements that make easier the process of duct cleaning, and in particular make more convenient a means for dampening shaft oscillation.

SUMMARY

An object of the invention is to control the oscillation or whipping of a rotating shaft in the space between a handheld driver and a duct or conduit opening into which the shaft runs. Another object is to improve the methodology of cleaning of chimneys, ducts and other conduits when using a rotating whip head at the end of a shaft. A still further object is to provide a device for suppression of oscillation of a shaft that is easily stowed when use thereof is not needed. A further object it to provide a device that is reliable and economic to manufacture and which does not require the use of a tool to operate.

An embodiment of the present invention includes a spinner, namely a device that is interposed between the driver and a rotatable shaft, at the end of which is attached a cleaning head. The spinner comprises a body circumscribed by a collar which has a tubular bore. When in the home or stored position, the collar is mounted on at least one substantially cylindrical surface of the body and is kept there by frictional retaining means, for example a spring loaded ball pressing on the bore of the collar. The driver may rotate the shaft with the collar in the home position. While doing so, the user may optionally grasp the collar while the body turns within the collar. Should the shaft tend to oscillate during rotation, the user may apply force sufficient to overcome the frictional retaining means of the collar, sliding the collar off the body and along the shaft to the working position (where oscillation is to be dampened), and the user will manually hold the collar there. When the dampening is no longer needed, the collar is moved back to its home position on the body.

Preferably, a shoulder near the proximal end of the body (that is, the end nearest the driver) keeps the collar from moving proximally, beyond the home position on the body. Amongst the frictional retaining means that may be used, and which may be overcome without the use of a tool, are one or more of a spring loaded ball pressing against the collar bore, a slightly compressed O-ring in groove around a cylindrical surface of the body, magnets embedded in the cylindrical surface (when the collar comprises magnetic material), and a deflectable tab.

During use of an embodiment of the invention, the input fitting of the body of the spinner is grasped by a rotary driver (which typically may be an electric hand tool). The artisan translates the driver and thereby the spinner and the shaft which is attached to the spinner. That causes the cleaning head to move along the length of the conduit being cleaned. In an embodiment of method of the invention, to suppress or prevent oscillation of the rotating shaft, the user grasps the collar while the spinner is rotating or stationary, applies distal direction force to overcome the collar retaining force, and moves the collar from the home position, along the shaft, to the working position, where he holds the collar manually as the shaft spins freely within the bore. When there is not further need for the dampening oscillation, the user moves the collar back to the home position, where the retaining means keeps it ready for further use.

The spinner is compact. When the collar is in the home position, the user may use the driver and other components to clean, as he would if the invention spinner were not present. An advantage is that the collar is conveniently at hand and can be put into use without need of a tool or without temporarily disconnecting the shaft from the driver. A spinner is economically manufactured.

The foregoing and other objects, features, and advantages of the present invention will become more apparent from the following description of preferred embodiments and accompanying drawings.

DESCRIPTION

The present inventions comprise an article and a method of use which help in the feeding of a rotating shaft that carries a duct cleaning head, as an artisan moves a rotating head back and forth within the duct to clean it. The present inventions will be useful in other applications than in the exemplary cleaning a duct. The inventions are described using the example of a semi-flexible shaft that is comprised of coupled-together segments. The inventions will be useful when the shaft is differently constructed, for instance when the shaft is a flexible cable. including a spiraled wire cable. The disclosure of aforementioned Patent Publication U.S. 2019/0118230 A1 "Duct cleaning device and method," is hereby incorporated by reference.

In brief, an invention tool comprises a collar (a tubular structure which may also be called a dampener) that inhibits oscillation of a rotating shaft by fitting loosely around the shaft while being manually held at the desired location along the shaft length, which is called the working position. The dampener has a home position, also called the stowed position, wherein the collar sets on a body that connects the driver to the shaft. The combination of body and collar are referred to here as the spinner.

Figure 1:
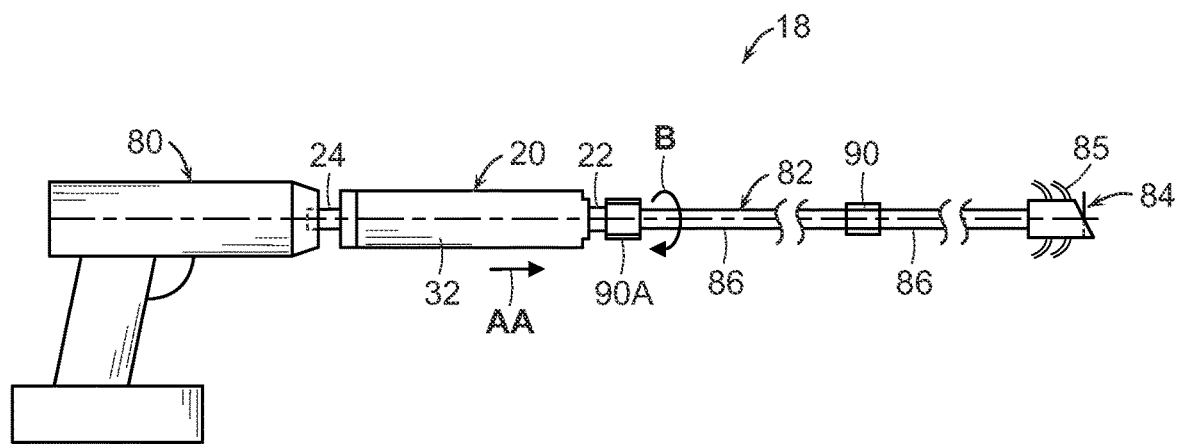
FIG. 1 is a side view of an assembly comprising a driver, a spinner, a segmented shaft and a whip head. The collar of the spinner is in the home position.

FIG. 1 shows a combination 18 of manually held driver 80 that holds and rotates a spinner 20 which is connected to shaft 82 by coupling 90A. Whip head 84 is at the far end, or distal end, of the shaft. The whip head has filaments 85 which, during rotation of the head, are flung outwardly, to flail the interior surfaces of the duct and loosen debris. Driver 80 may be an electric powered drill head or the like. During use, the driver is actuated to rotate the shaft at chosen speeds. The driver is manually moved laterally to push and pull the shaft lengthwise. Shaft 82 is comprised of a multiplicity of segments 86 (typically each about 3 feet long) that are connected to each other by couplings 90. Exemplary couplings are described in U.S. Patent No. 10,288,123 and the '230 publication mentioned above. Exemplary couplings 90 typically are somewhat larger in diameter than the shaft segments being interconnected.

Figure 2:
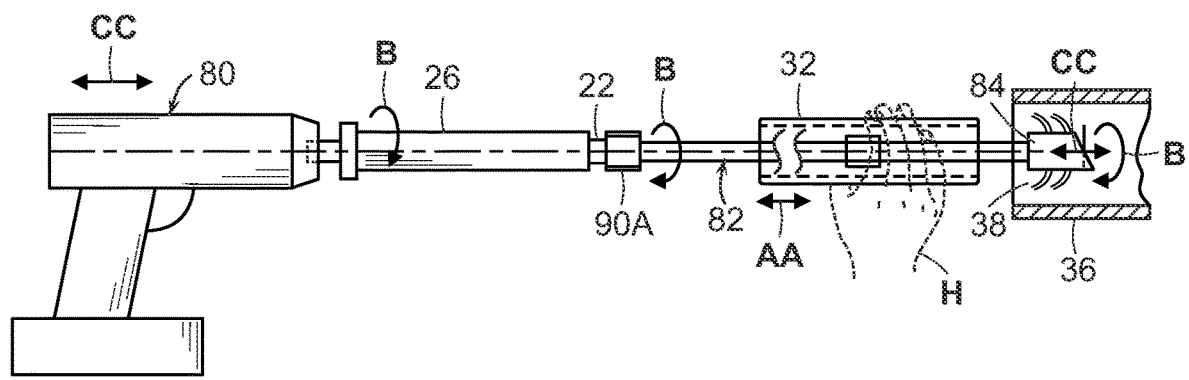
FIG. 2 is a view like FIG. 1 with the addition of a duct and other aspects, to help illustrate the functioning and use of the spinner. The collar of the spinner is shown in working position.
Figure 3:
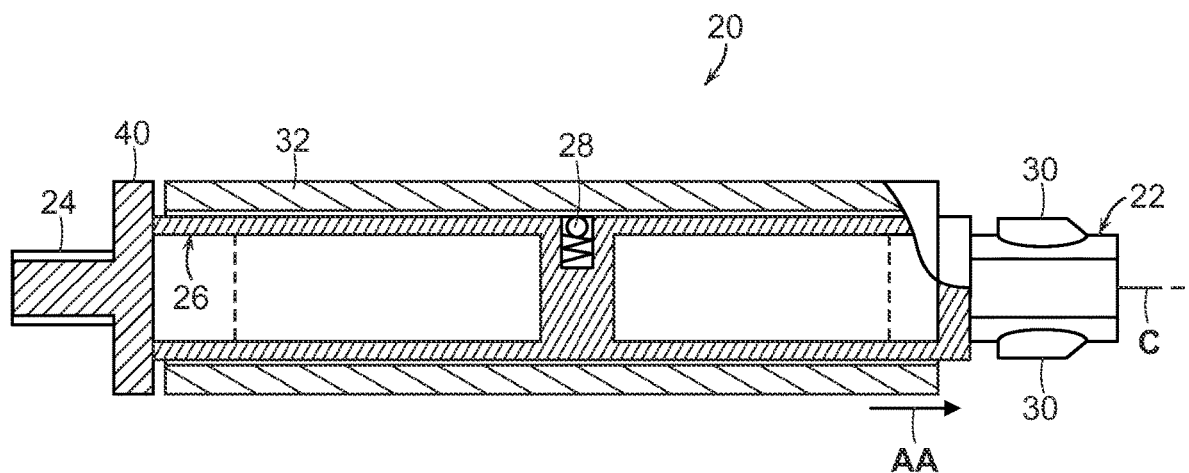
FIG. 3 is a lengthwise cross section of the exemplary spinner of FIG. 1 and FIG. 2 having a distally slidable collar and a spring loaded ball frictional retaining means.
Figure 4:
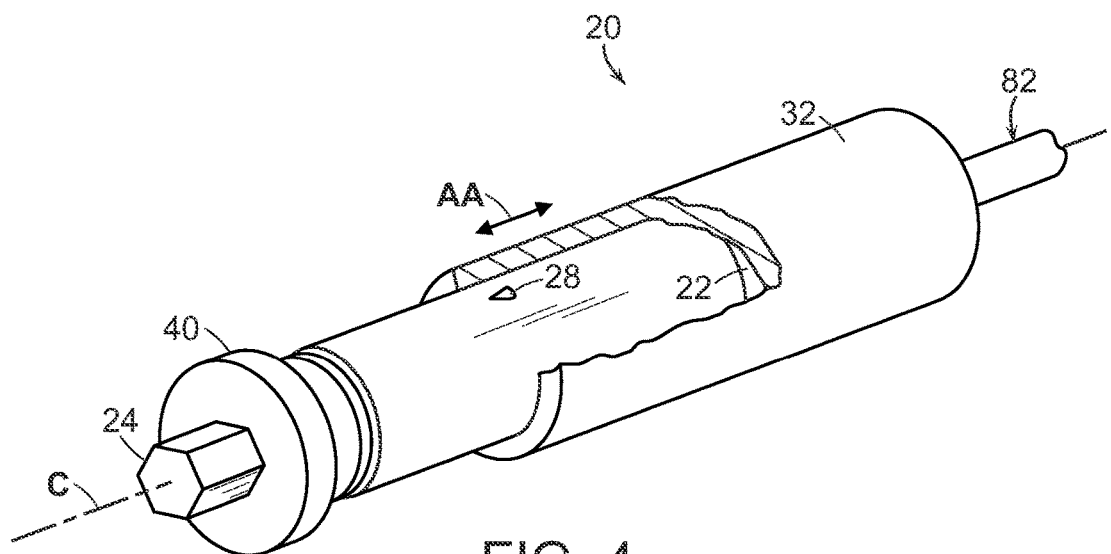
FIG. 4 is a perspective view of the spinner shown in FIG. 3 with the collar partially removed.

FIG. 2 shows the combination of components pictured in FIG. 1 during use. FIG. 3 is a lengthwise partial cross section of spinner 20. FIG. 4 is a perspective view of spinner 20 with the collar 32 partially moved away from the home position, preparatory to the collar being moved to the working position. FIG. 2 is mostly like FIG. 1, showing the combination with the whip head 84 positioned just within the end opening 38 of duct 36 and the collar is in a working position. Part rotation is indicated by arrows B. Arrows CC indicate the lengthwise back and forth movement of head 84 and driver 80 during use.

With reference to FIGS. 1, 2 and 3, spinner 20 comprises body 26 upon which is slidably mounted collar 32. The arrows AA indicate potential motion of the collar at its then-location. (The proximal end of an object in this description is that which, during use, is closest to the driver during use; a distal end of an object is that which is furthermost from the driver.) Spinner 20 has a lengthwise central axis C, as do other embodiments and parts illustrated herein. Body 26 has an input fitting 24 at its proximal end that may be a circular stub shaft, compared to the hexagonal shaft shown. The driver holds and rotates the body of the spinner. Body 26 has an output fitting 22 at its distal end, which is preferably shaped like a male-end half coupling, as shown. Exemplary fitting 22 comprises two spring loaded buttons 30 and is capable of mating with a female-end half of a coupling 90, to thereby drive a shaft. In the generality of using the invention, in special situations, rather than the spinner being directly gripped by the driver, there may be a fitting or a segment of shaft between the driver and the input fitting of the spinner.

Referring to FIG. 3, in its stowed position collar 32 circumscribes the cylindrical outside surface of body 26. Shoulder 40, at the proximal end of the body, extends radially outwardly further than the exterior surface of the body which is surrounded by the collar. The shoulder thereby limits lengthwise motion of the collar toward driver 80. The collar has a fit on the body exterior that enables lengthwise sliding motion, so the collar may be moved onto and off the body. The collar will be appropriate chamfered at its proximal bore end. Preferably, the fit between collar and body enables rotation of the collar about the body when the user manually grabs the collar while the driver is rotating the body, but at the same time, the collar whether static or rotating with the body, will not move off the body without the user applying manual lengthwise force.

With reference to FIG. 3, to provide the frictional retaining force, spinner 20 comprises a spring loaded ball 28 that is captured within a socket of body 26. When the collar is at its home position on the body, the ball presses radially outwardly against the collar interior, thus providing resistance to lengthwise motion. The resistance can be overcome by user force. Optionally, the bore of the collar may have a circumferential groove (not shown) into which the ball will project when the collar is in home position.

FIG. 2 shows collar 32 in a working position in proximity to the duct opening 38, after having been moved there by the user who pulled it lengthwise from the body and along the shaft. The Figure intends to communicate that the collar is being held manually (a user's hand H is shown in phantom) at a location along the length of the shaft where the user has observed, or has anticipated, oscillation. Manual motion of the collar along the shaft is indicated by the double headed arrow AA. By holding the collar, the artisan can transversely stabilize the shaft and control its lateral oscillation during rotation. During use, an artisan may move the shaft lengthwise while holding the collar fixed in space, or alternatively, may move the collar back and forth simultaneously with the linear motion of the shaft. In another alternative, holding of the driver and holding of the collar in working position are shared between an artisan and an assistant.

The collar bore has sufficient dimension to provide clearance relative to the shaft to enable a segment of the shaft, or a coupling, to rotate easily within the collar. In an exemplary embodiment of the invention, a segmented shaft is about ¼ inch to ¾ inch outside diameter; a coupling is respectively about ⅜ inch to ⅞ inch outside diameter, and a collar has a bore diameter of about one inch, a wall thickness of about ⅛ inch, and a length of about 5 inches. Thus the length of an exemplary collar is greater than the inside diameter, preferably three times more or greater.

When inhibition of shaft lateral motion is no longer needed (such as when there is a decrease in the length of shaft extending through free space, a decrease in rotational speed, etc.), the user may move the collar back along the shaft and re-position the collar on the body, where, due to the action of the spring loaded ball or other alternative retaining means, the collar will stay stowed and conveniently available for further use as the user continues to rotate the shaft with the driver. In another use of the present invention, when oscillation dampening is not needed, a user can grasp the collar while it remains on the body and thereby help steady the driver.

Figure 5:
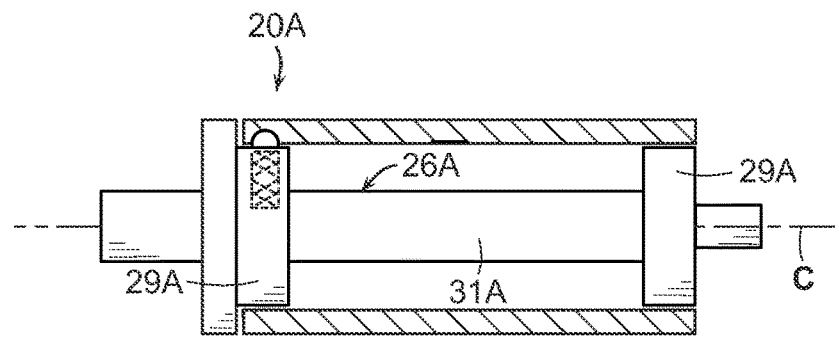
FIG. 5 is a cross section of a spinner having a dumbbell shape body comprised of two spaced apart cylindrical sections.

A preferred body, as shown in FIG. 3, is mostly hollow (but for the structure to enable a spring loaded ball) to minimize weight and material cost. Alternatively, a body may be solid, or entirely hollow. Or a spinner body may be dumbbell shape as is the body 26A of spinner 20A shown in FIG. 5. Spinner body 26A comprises two spaced apart cylindrical or disk-like portions 29A, connected by shaft 31A. In a modification of spinner 20A, not shown, there may be one or more additional cylindrical portions positioned between the two end portions 29A. With respect to the body, within the definition of "cylindrical portion" will be structures such as serrated disks and the like, the outermost portions of which lie on an imaginary cylindrical surface and enable a body to rotate within a collar and frictionally hold it.

Figure 6:
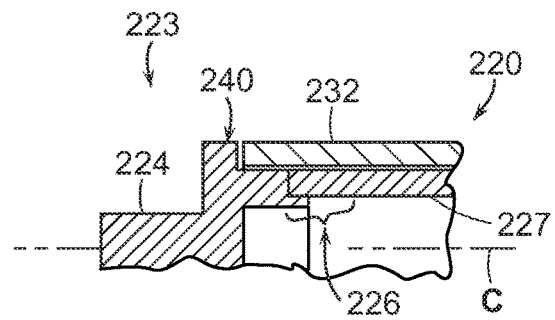
FIG. 6 is a partial lengthwise cross section of a spinner having an input end and an output end, connected by a piece of tubing.

Spinner 220, another embodiment of the invention, is constructed as shown in FIG. 6. Body 226 is shown with collar 232 in home position. Body 226 is comprised of a piece of tubing 227 and two similar opposing end parts; proximal end part 223, is shown. End 223 comprises fitting 224 and shoulder 240. It will be appreciated that the distal end part is constructed analogously to the proximal end part 223 sans shoulder. Tube 227, which runs between the end parts, may be pressed onto, bonded to, or welded to each end part.

Generally, a spinner body or its parts may be made of aluminum alloy or steel. And a collar may be made of plastic, or alternatively of a metal such as steel. Optionally, the interior of the collar may have wear resisting surfacing. A collar may have an anti-friction interior coating. Other metals and plastics may be used alternatively for making the parts of a spinner, as such materials have utility in engineering art and accommodate particular special features and needs of a spinner embodiment.

Figure 7:
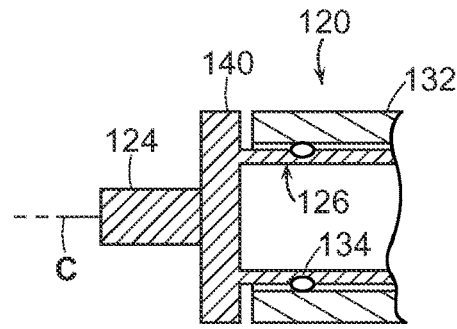
FIG. 7 is a partial lengthwise cross section of a spinner where a circumscribing O-ring is the retaining means.

Retaining means different from the ball and spring shown in FIG. 3 may be used to hold a collar in its home position. FIG. 7 illustrates, in the form of spinner 120, how body 126 has a circumscribing groove within which is positioned O-ring 134. The O-ring may be made of an elastomer or polymer (e.g., Teflon® plastic), so that the O-ring is compressed when the collar is moved lengthwise over it. A user may pull the collar distally by overcoming the friction between the O-ring and the bore of the collar.

Figure 8:
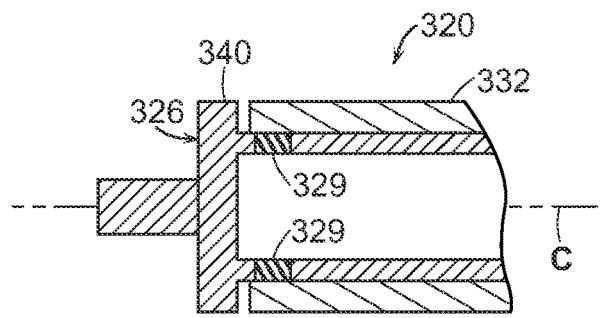
FIG. 8 is a partial lengthwise cross section of a spinner where a magnetically attractive collar is retained on the body cylindrical surface by means of one or more embedded magnets.

FIG. 8 shows a spinner 320 comprising a body 326 with shoulder 340 and collar 332. Two diametrically opposed magnets 329 are set within holes of the cylindrical outer surface of the body near the proximal end. Collar 332 or just a portion thereof which overlies the magnets when the collar is in home position, is made of a ferromagnetic material such as a carbon steel, a low alloy steel or a AISI 400 series stainless steel. When the collar is moved lengthwise so it is at its home position and an end overlies the magnets, as shown in FIG. 8, the attraction of the collar to the magnets hinders lengthwise motion of the collar away from the home position. Fewer or more magnets may be used. A magnet(s) may alternatively or in addition be positioned in the face of the shoulder that is contacted by the end of the collar or in the collar.

Figure 9:
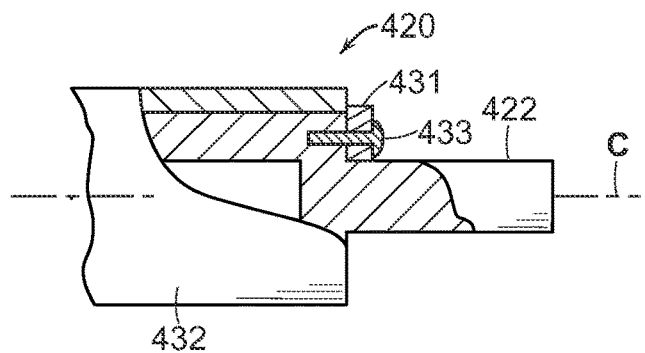
FIG. 9 is a partial lengthwise view of the distal end of a spinner having a pivotable tab at the distal end of the collar, as retaining means. A cutaway shows some of the cross section.
Figure 9A:
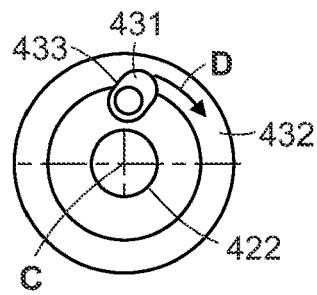
FIG. 9A is an end view of the spinner of FIG. 9.

FIG. 9 shows a partial cutaway partial side view and FIG. 9A shows an end view of spinner 420 which comprises distal end output fitting 422, body 426, and collar 432. The retaining means for the collar comprises a pivotable tab 431 which is secured to a shoulder at the distal end of the body by pin 433. As shown, the tab prevents motion of the collar off the body and away from the driver. Arrow D in FIG. 9A shows how tab 431 may be pivoted in a plane perpendicular to the C axis, which will enable the collar to move off the body, away from the driver, along the length of the shaft. It will be appreciated that the tab may be provided with both a spring and a cam like shape, so that sufficient force on the collar will cause the tab to rotate in direction D or otherwise deflect sufficiently, thereby to enable the collar to move off the body. In another embodiment, not shown, there is a push button built into the body, and when the collar is home, the button projects through an opening in the collar. An advantage is positivity of location; a disadvantage of that (and some other embodiments described or suggested herein) is that they require the user to stop rotation of the spinner to move the collar off the body.

Preferably a retaining means used in a spinner will not require use of any tool, as the foregoing examples illustrate. Nonetheless, using a wrench or screwdriver is an alternative. For instance, the collar may be kept in the home position by a screw that runs radially through the collar to engage the bore of the body. Of a screw may run lengthwise into the distal end of the body, so the screw head blocks the collar from moving distally. (Reference is made to FIG. 9.)

Figure 10:
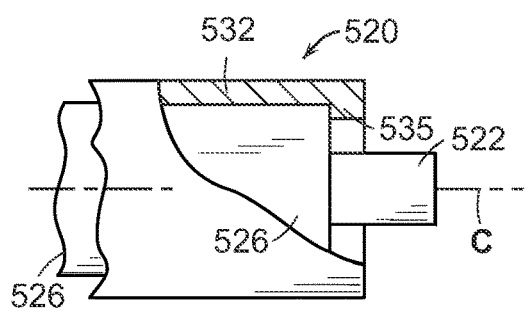
FIG. 10 is a partial lengthwise cutaway view of the distal end of a spinner having a collar distal end that comprises an inwardly extending flange that limits motion in the proximal direction.

While a body having a shoulder at the proximal end, as previously described, is preferred because of its certainty of preventing further proximal direction motion of a collar at the home position, an invention embodiment may be without a shoulder or its equivalent on the body. As an example, FIG. 10 shows spinner 520 comprising body 526, output fitting 522 and collar 532. The collar has an inward extending flange 535 which contacts the distal end face shoulder of the body, where fitting 522 extends along the C axis.

Figure 11:
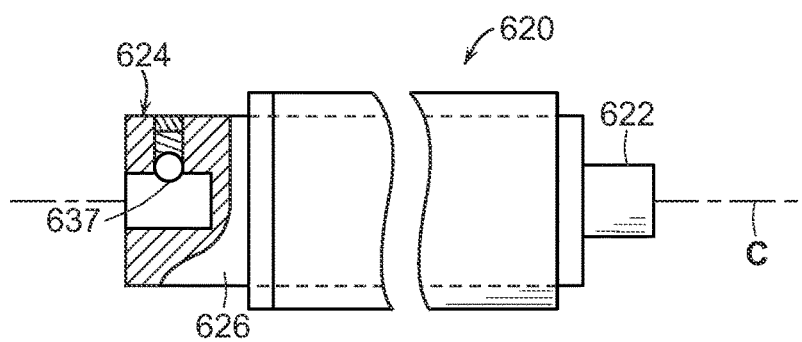
FIG. 11 is a partial lengthwise cutaway view of a spinner having an integral female input fitting.

Particular input and output fittings have been described. Other types of spinner input and output fittings may be used, according to the associated shaft fittings or the user's needs. FIG. 11 shows a spinner 620 which comprises body 626, output fitting 622 and an input fitting 624. The input fitting is configured as a female fitting that is integral with the body. When the input fitting is shaped to receive the shaft of a driver (not shown), a spring loaded ball 637 is provided to press into a groove that is familiar around many hexagonal cross section driver shafts. In another embodiment, not pictured, the shaft is received in a female cavity at the distal end of the spinner and is held there by a set screw. (In opposition to the foregoing, a user may prefer a fitting and connection at one or both ends of the spinner which will slip as would a clutch at high load that may occur should the shaft jam.) In the generality of the invention, an input fitting and an output fitting comprise structure that enables attachment of another article to the spinner for, as the situation may present, rotatably driving the spinner or being rotatably driven by the spinner, and for simultaneously translating the spinner or being translated by the spinner.

While the exterior surface of the body, the bore of the collar, and the exterior surface of the collar have been described as being cylindrical, deviations from true or perfect cylindrical surfaces are comprehended. And the exterior of the collar may be irregular, for example it may have lengthwise or circumferential ridges or other texturing to aid gripping thereof.

The invention provides improvement in the process of cleaning ducts and in analogous processes because the collar is stored on the body of the spinner when not needed. When needed, the collar can be quickly moved to the point where it is needed to control shaft oscillation. The invention is simple and easily constructed, and fulfils the objects of the invention.

The invention, with explicit and implicit variations and advantages, has been described and illustrated with respect to several embodiments. Those embodiments should be considered illustrative and not restrictive. Any use of words such as "preferred" and variations suggest a feature or combination which is desirable but which is not necessarily mandatory. Thus embodiments lacking any such preferred feature or combination may be within the scope of the claims which follow. Persons skilled in the art may make various changes in form and detail of the invention embodiments which are described, without departing from the spirit and scope of the claimed invention.

What is claimed is:

1. A spinner, for use in reducing rotating shaft oscillation, having a proximal end, a distal end, and a lengthwise-running central axis, the spinner comprising:
    a body having a proximal end, a distal end, a length, and at least one cylindrical surface portion having a length, centered on said central axis;
    an input fitting integral with or attached to the body at the proximal end thereof;
    an output fitting integral with or attached to the body at the distal end thereof;
    a collar having a proximal end, a distal end, and a bore shaped to fit and rotate about the at least one cylindrical surface portion and to slidably move along the length of said at least one cylindrical surface portion; and
    means for retaining the collar on the body by resisting lengthwise motion in the direction of the distal end of the body.

2. The spinner of claim 1 wherein the means for retaining the collar on the body is selected from the group comprising (a) a pivotable tab at the distal end of the body, and (b) one or more magnets embedded in the body.

3. The spinner of claim 1 wherein the body further comprises a shoulder at the spinner proximal end, for contacting the proximal end of the collar and thereby limiting lengthwise motion of the collar in the direction of the proximal end of the body.

4. The spinner of claim 3 wherein the at least one cylindrical surface portion runs continuously from the location of the output fitting to said shoulder.

5. The spinner of claim 1 wherein the body is comprised of two cylindrical surface portions that are spaced apart from each other.

6. The spinner of claim 5 wherein the two cylindrical surface portions are connected to each other by a shaft.

7. The spinner of claim 1 wherein the means for retaining the collar applies radial force to the bore of the collar, which creates a frictional force that can be overcome by a user manually applying distal-direction force to the collar.

8. The spinner of claim 1 wherein the means for retaining the collar creates friction between the body and the collar that can be overcome by a user manually applying distal-direction force to the collar.

9. The spinner of claim 8 wherein said means for retaining the collar that creates friction is selected from the group comprising (a) a spring loaded ball embedded in the body and (b) an O-ring circumscribing the at least one cylindrical surface portion of the body.

10. The spinner of claim 1 wherein the body further comprises a shoulder at the proximal end, for contacting the proximal end of the collar and thereby limiting lengthwise motion of the collar in the proximal direction; and wherein the means for retaining comprises at least one spring loaded ball embedded in the body and pressing on the bore of the collar.

11. The spinner of claim 1 in combination with
    a driver connected to the input fitting of the spinner, for rotating and translating lengthwise the spinner;
    a segmented or one-piece shaft having a length, a first end, and a second end, the first end connected to the output fitting of the spinner for transmitting rotary and linear-lengthwise motion; and
    a cleaning head connected to the second end of the shaft;

wherein, the collar is manually movable lengthwise from the body and then lengthwise along a portion of the shaft;

wherein, the shaft is freely rotatable within the collar when the collar is moved from the body to a location along the shaft.

12. The spinner and combination of claim 11 wherein the cleaning head is a whip head comprising filaments.

13. The spinner and combination of claim 11 wherein the shaft is comprised of a multiplicity of segments that are interconnected by couplings.

* * * * *